United States Patent [19]

Kocher

[11] Patent Number: 4,611,503
[45] Date of Patent: Sep. 16, 1986

[54] MEANS FOR REMOVING BEARING FROM CRANKSHAFT

[75] Inventor: Erich J. Kocher, Milwaukee, Wis.

[73] Assignee: Vilter Manufacturing Corporation, Milwaukee, Wis.

[21] Appl. No.: 685,496

[22] Filed: Dec. 24, 1984

[51] Int. Cl.$^4$ .......................... F16F 15/26; F16C 3/08
[52] U.S. Cl. .................. 74/603; 123/192 B; 384/562; 384/585
[58] Field of Search .......... 74/603; 123/192 R, 192 B; 384/559, 562, 563, 585, 542

[56] References Cited

U.S. PATENT DOCUMENTS

| | | | |
|---|---|---|---|
| 1,813,315 | 7/1931 | Peterman | 384/562 |
| 2,427,638 | 9/1947 | Vilter et al. | 417/270 |
| 3,428,373 | 2/1969 | Imse | 384/562 |
| 3,957,319 | 5/1976 | Gorski | 384/563 |
| 4,342,236 | 8/1982 | Everts | 74/603 |

*Primary Examiner*—G. L. Walton
*Attorney, Agent, or Firm*—James E. Nilles; Thomas F. Kirby

[57] ABSTRACT

A reciprocating type gas compressor comprises a hollow frame or housing having spaced apart end walls, a motor-driven crankshaft disposed within the housing and rotatably mounted on bearing assemblies on the end walls and connecting rods connected to crank pins on the crankshaft for driving pistons located within the housing. The crankshaft comprises a drive shaft at one end and a pump shaft the other end, both extending along a common axis of rotation. The crankshaft also comprises a pair of axially spaced apart counterweights located between the two shafts and a crank arm or link located between the counterweights. A crank pin extends from each counterweight to the link along a pin axis which is parallel to and spaced apart from the common axis of rotation. Each bearing assembly has a hollow cylindrical inner race which is friction-fitted on a shaft at an end of the crankshaft and abuts the side of one counterweight. To enable removal of each friction-fitted bearing assembly from its shaft without damage thereto, a pair of threaded bores extend through portions of each counterweight and the bore axes are parallel to but located on opposite sides of the common axis of rotation and each bore is aligned with the inner end surface of the inner race of the associated bearing assembly. Each threaded bore accommodates a long jack screw which is temporarily rotatably inserted thereinto so as to engage the inner race and force the bearing assembly off of its shaft for servicing or replacement.

9 Claims, 9 Drawing Figures

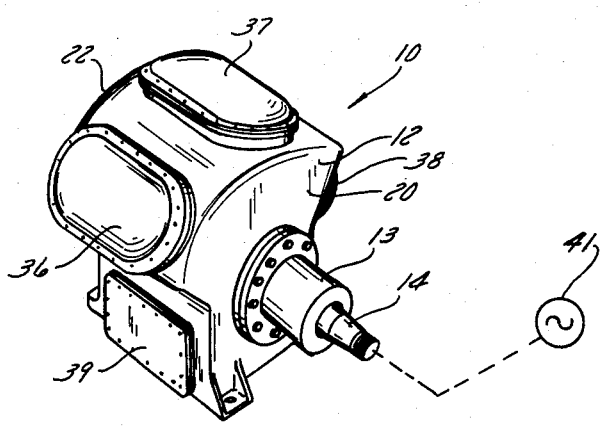
FIG. 1
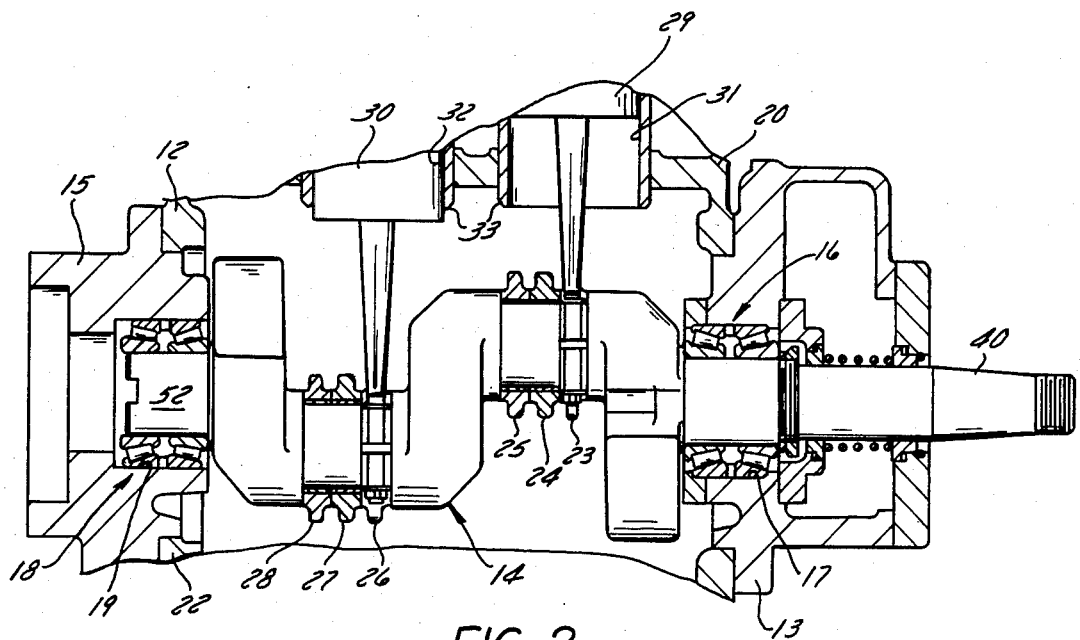
FIG. 2
FIG. 3

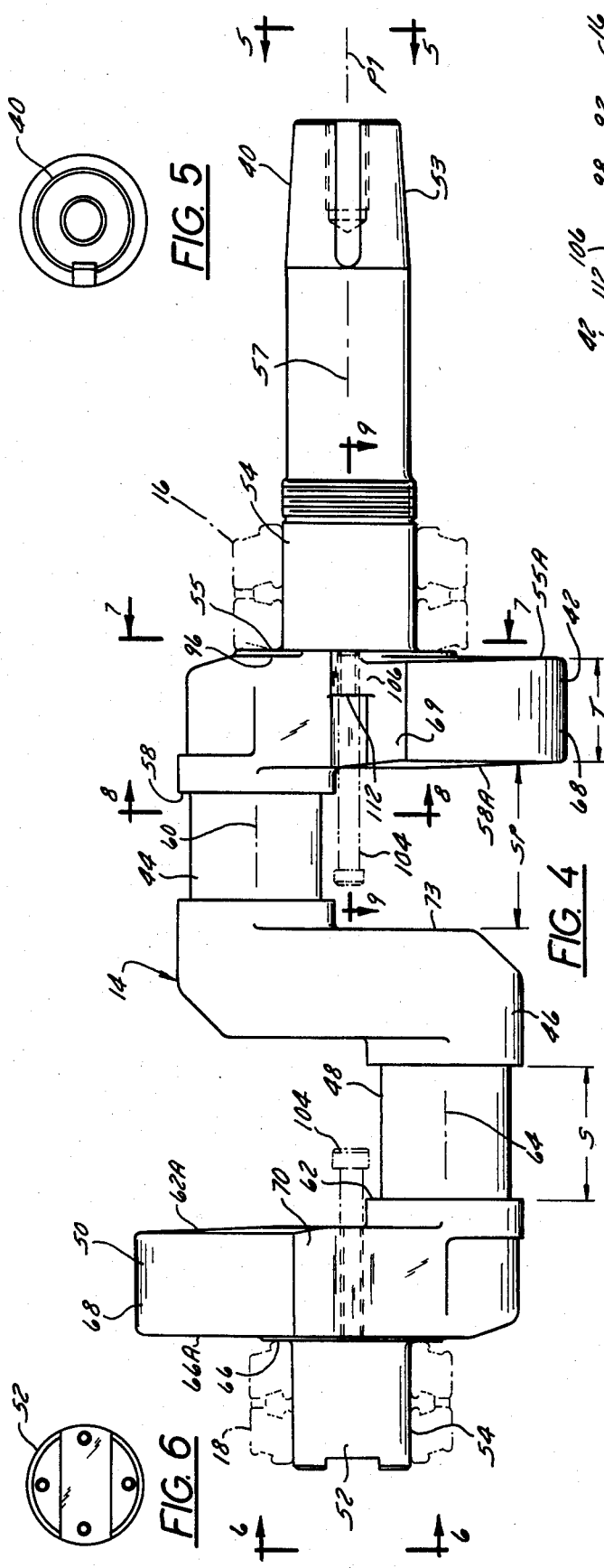
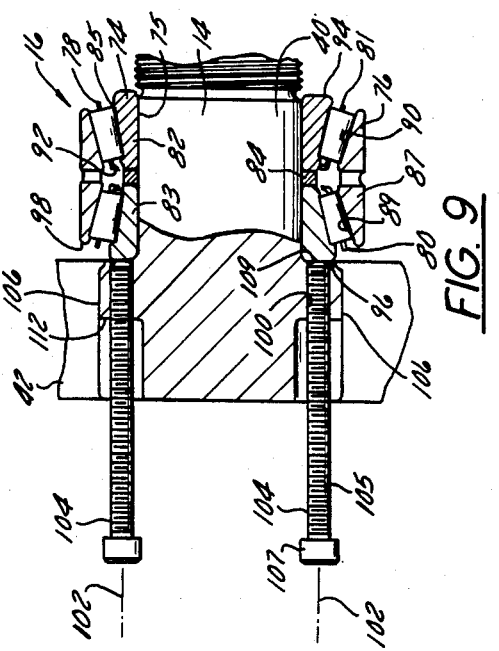
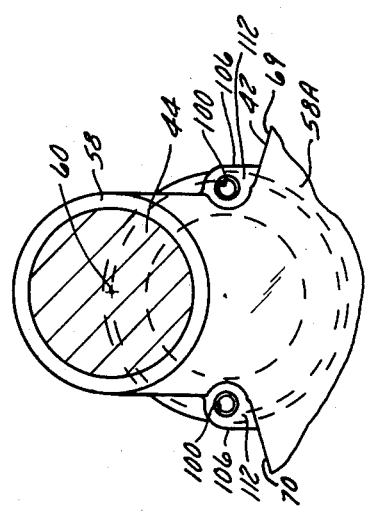
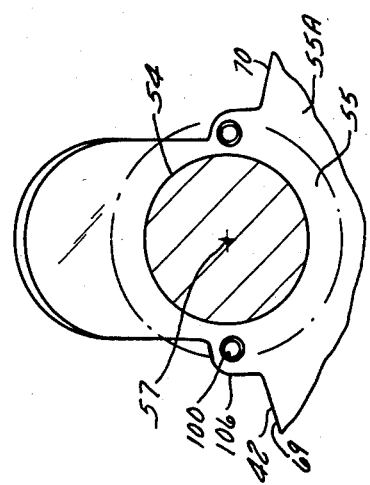

ABRAHAM 4,611,503

MEANS FOR REMOVING BEARING FROM CRANKSHAFT

BACKGROUND OF THE INVENTION

1. Field of Use

This invention relates to improved means for removing a bearing which is mounted by frictional engagement on a shaft at an end of a crankshaft.

2. Description of the Prior Art

U.S. Pat. No. 2,427,638, which is owned by the Assignee of the present application, discloses a reciprocating type gas compressor which is used to compress refrigerant gases used in refrigeration systems. That compressor comprises a hollow cast metal frame or housing in which are located a motor-driven rotatable crankshaft, connecting rods to be reciprocably driven by the crankshaft, and pistons driven by the connecting rods. The crankshaft comprises a drive shaft at one end and a pump shaft at the opposite end, both disposed along a common axis of rotation, and main bearing assemblies are secured on the opposite end walls of the housing for rotatably supporting the opposite ends of the crankshaft. A pair of axially spaced apart counterweights are located between the drive shaft and pump shaft and a link is located between the counterweights. A pair of axially spaced apart crank pins are provided and each is mounted between a counterweight and the link. Each bearing assembly comprises an inner bearing race having a cylindrical bore therethrough for accommodating the shaft on which it is mounted, a hollow cylindrical outer bearing race arranged concentrically around and spaced from the inner bearing race, and a plurality of either ball or roller type bearing elements entrapped in the annular space between the inner and outer races. The inner bearing race is press-fitted or friction-fitted in a very close friction fit on a cylindrical portion of the shaft and the inner end of the bearing abuts the outer side of the associated counterweight. The main bearings are installed on the crankshaft before the latter is installed in the housing by application of force directly against the outer ends of the inner bearing races in a direction toward the associated counterweights. When a bearing assembly needed to be removed from the crankshaft, it was heretofore necessary to employ a conventional bearing puller having two or more claws radially disposed around a center pin. In use, the center pin of the puller engages and bears against one end of the crank shaft while the claws engage and exert a pulling force against the rear side of the outer race of the bearing assembly. During such removal, the pulling force was transmitted from the outer race, through the ball or roller elements, to the inner race. However, the main bearing is not designed to be subjected to such axial forces or loads during installation, operation or removal and, frequently, excessive force and/or unbalanced forces, exerted during removal damaged the bearing assembly and rendered it unfit for re-installation.

SUMMARY OF THE INVENTION

In its broad aspect, the present invention requires a crankshaft having a counterweight, a shaft extending from one side of the counterweight along an axis of rotation and adapted to have a bearing assembly friction-fitted on a portion thereof, and a crank pin extending from the opposite side of the counterweight. The crankshaft is provided in accordance with the invention with a plurality of threaded screw-receiving holes extending through said counterweight, said holes having hole axes which are parallel to, spaced from and lie on different sides of the axis of rotation, each hole being positioned so as to be aligned with the hollow cylindrical inner portion or race of the bearing mounted on the shaft. Simultaneous rotating equalized insertion of screws into the holes from the said opposite side of the counterweight causes the screw ends to engage the inner portion or race of the bearing assembly and force the bearing assembly away from the counterweight and off of the said portion of the shaft.

In a preferred embodiment disclosed herein the crankshaft comprises a pair of counterweights, shafts at opposite ends of the crankshaft, each shaft extending from the outer side of a counterweight along a common axis of rotation and having a shaft portion adapted to have a bearing assembly friction-fitted thereon, in abutting relationship with the outer side of a counterweight, a pair of crank pins, each crank pin extending from the inner side of a counterweight along a crank pin axis which is spaced from and parallel to said common axis of rotation, and a link connected between the ends of the crank pins. Each counterweight is provided with at least a pair of threaded screw-receiving holes extending through portions of the counterweight. Each pair of holes have hole axes which are parallel to, spaced from and lie on different sides of said common axis of rotation, hole being positioned so as to be aligned with the inner portion or inner bearing race of a bearing assembly on the shaft.

Each screw is of sufficient length to ensure that the bearing assembly can be pushed completely off the shaft portion whereat frictional engagement occurs. Therefore, the shank of each screw, measured from the underside of its head to its opposite end, must be at least as long as the distance between the portion of the inner side of the counterweight whereat the screw enters and the outer side of the counterweight whereat the screw exits plus the confronting length of the shaft portion whereat pressfitting of the bearing assembly occurs. However, the entire screw cannot be longer than the distance between said portion of said inner side of the counterweight whereat the screw enters and the confronting side of the crankshaft link or else the screw cannot be inserted. Thus, in further accordance with the invention, the counterweight is provided with a counterweight portion or flange in which the screw-hole is formed which is of lesser thickness than the counterweight and is so located on the counterweight that the distance between the flange face whereat the screw enters and the aforesaid side of the link is at least as great as the length of the shank of a screw of the aforedescribed required size.

Bearing removal means in accordance with the invention offer several advantages over the prior art. For example, damage to the bearing assemblies during removal is avoided since removal force is applied axially directly to the inner race or inner portion of the bearing assembly. The need for a conventional bearing puller is eliminated and two ordinary easily obtainable screws of approporiate length are employed in place thereof. The screw holes are formed during manufacture of the crankshaft and, being embodied therein, cannot be lost or misplaced. The invention is provided at a nominal cost during manufacture and does not offset or interfere with normal crank shaft operation. Other objects and advantages will hereinafter appear.

DRAWINGS

FIG. 1 is a perspective view of the outside of a gas compressor embodying the present invention;

FIG. 2 is an enlarged sectional view of a crankshaft and other components inside the housing of the compressor of FIG. 1;

FIG. 3 is an enlarged perspective view of the crankshaft of FIG. 2 and showing bearing removal means in accordance with the invention;

FIG. 4 is an enlarged side elevation view of the crankshaft and bearing removal means of FIGS. 2 and 3;

FIG. 5 is an elevation view of the drive shaft at one end of the crankshaft taken on line 5—5 of FIG. 4;

FIG. 6 is an elevation view of the pump end shaft at the other end of the crankshaft taken on line 6—6 of FIG. 4;

FIG. 7 is an elevation view of a portion of the outer side of one of the counterweights taken on line 7—7 of FIG. 4;

FIG. 8 is an elevation view of a portion of the inner side of one of the counterweights taken on lines 8—8 of FIG. 4; and FIG. 9 is an enlarged side elevation view, partly in cross-section, and showing the main bearing assembly therefor in cross-section and removal screws.

DESCRIPTION OF A PREFERRED EMBODIMENT

FIG. 1 shows a reciprocating type six-cylinder gas compressor 10 such as is used to compress gas in a refrigeration system or the like. As FIGS. 1 and 2 show, compressor 10 comprises components including a one-piece cast iron compressor or steel frame or hollow housing 12, a one-piece forged crankshaft 14, and two main bearing assemblies 16 and 18 which are mounted in holes 17 and 19, respectively, in bearing supports 13 and 15, respectively, in the end walls 20 and 22, respectively, of housing 12 and rotatably support crankshaft 14 in housing 12. The components of compressor 10 further include six connecting rods 23, 24, 25, 26, 27 and 28 which are connected between crankshaft 14 and six pistons, only 29 and 30 of which are shown, which are slidably mounted for reciprocating movement in cylinders 31 and 32, respectively, and which take the form of sleeves 33 mounted in housing 12. Cylinder heads or covers 36, 37 and 38 are provided on housing 12, as well as an access cover 39. In operation, crankshaft 14 is rotatably driven by an electric motor 41 and imparts reciprocating motion to the connecting rods 23-28 and their associated pistons. As will be understood, two or more compressors such as 10 could be ganged together end-to-end and driven by a single motor.

As FIGS. 3 and 4 show, crankshaft 14 comprises a drive shaft 40 at one end, a first counterweight 42, a first crank pin 44, a center link or crank arm 46, a second crank pin 48, a second counterweight 50, and a pump shaft 52 at its other end. As FIG. 2 shows, each crank pin 44 and 48 is adapted to have three connecting rods associated therewith. Drive shaft 40, which has a tapered or conical end portion 53 and a cylindrical portion 54 on which bearing assembly 16 is press-fitted, extends from the outer side 55 of first counterweight 42 along an axis of rotation 57. First crank pin 44, which is cylindrical, extends between the inner side 58 of first counterweight 42 and one end of center link 46 along a first crank pin axis 60 which is parallel to and laterally spaced from axis of rotation 57. Second crank pin 48, which is cylindrical, extends between the other end of center link 46 and an inner side 62 of second counterweight 50 along a second crank pin axis 64 which is parallel to and laterally spaced from axis of rotation 57. Second crank pin axis 64 is also parallel to and laterally spaced from first crank pin axis 60. Pump shaft 52 is cylindrical and extends from the outer side 66 of second counterweight 50 along the aforesaid or common axis of rotation 57 along which drive shaft 40 extends. Thus, the three axes 57, 60 and 64 lie in a common plane P1, which is understood to be a vertical plane in FIGS. 2, 3, 4, 7 and 8.

Each counterweight 42 and 50 includes a main portion which has the general configuration of a quadrant of a circle and includes a curved outer surface 68 and two generally flat edge surfaces 69 and 70. Each counterweight 42 and 50 has a predetermined thickness T measured between its outer side (55A or 66A) and its inner side (58A or 62A). The heaviest portion of each counterweight 42 and 50 is radially offset from its associated crank pin 44 and 48, respectively, and is properly weighted, proportioned and positioned relative to its associated connecting rods and pistons so as to balance the entire assembly. The thickness T of first counterweight 42 (measured between sides 55A and 58A in FIG. 4) is less than the space SP between the inner side 58A of counterweight 42 and the confronting surface or side 73 of center link 46 for reasons that hereinafter appear. The second counterweight 50 is similarly dimensioned.

As FIG. 2 shows, drive shaft 40 and pump shaft 52 are received in main bearing assemblies 16 and 18, respectively. The bearing assemblies 16 and 18 are received in bearing supports 13 and 15, respectively, on the end walls 20 and 22, respectively, of compressor frame 12. In practice, the bearing assemblies 16 and 18 are mounted on the crankshaft 14 before the crankshaft is placed within the hollow compressor frame 12. Each bearing assembly 16 and 18 is disposed as close as possible to the outer side 55 and 66, respectively, of its associated counterweight 42 and 50, respectively. At high rotational speeds the crankshaft 14 functions under severe stress conditions because at each power stroke it is subjected to sudden impact-like torsional loading. The crankshaft 14 must therefore be of very rigid construction and it must not deflect. Better resistance to deflection is obtained by close positioning of the crank shaft main bearings 16 and 18 relative to each other and each is as close as possible to its associated counterweight 42 and 50, respectively. The bearing assemblies 16 and 18 are substantially identical to each other as regards construction and mode of operation and differ only in size. Therefore, only main bearing assembly 16 is hereinafter described in detail.

As FIGS. 2, 3 and 9 show, main bearing assembly 16 takes the form of a double-row, double-cup, single cone type anti-friction roller bearing with cone spacer. Such a bearing is commercially available as bearing type TDO 581-572D, Assembly No. 90317, from Timken Roller Bearing Company, Canton, Ohio. As FIG. 9 shows, main bearing assembly 16 comprises an annular inner race 74 having a cylindrical bore 75 through the center thereof, an annular outer race 76 disposed concentrically around inner race 74, rolling elements 78 in the form of tapered rollers disposed between inner race 74 and outer race 76, and two cages 80 and 81 for retaining and spacing the rolling elements. Inner race 74 comprises two single cones 82 and 83 with a cone spacer 84 therebetween and each cone comprises an annular groove 85 around the outside thereof. Outer cone 82 has an outer face 94 and inner cone 83 has an outer face 96 which abuts surface 55 of counterweight 42 (see FIGS. 4 and 9). Outer race 76 takes the form of a cup having a cylindrical outer surface 87 and two oppositely sloped conical inner surfaces 89 and 90. Each of the two cages 80 and 81 accommodates one row of rolling elements 78 and each has an inner flange 92 which engages the inner edge of a cone 82 or 83.

The diameter of bore 75 in inner race 74 of main bearing assembly 16 is so close in size to the outside diameter of cylindrical portion 54 of drive shaft 40 of crankshaft 14 that the main bearing assembly 16 must be press-fitted onto portion 54. This is accomplished before the crankshaft 14 is mounted within frame 12. The bearing assembly 16 is primarily designed to resist radial loads and minor thrust loads acting in the axial direction of the shaft 40. Therefore, press-fitting is accomplished by maintaining the crankshaft 14 in fixed position and forcing bearing assembly 16 onto and along portion 54 of drive shaft 40 by means of a tool (not shown), such as a hollow cylindrical sleeve, which bears against the outer face 94 of outer cone 82 of inner race 74. When bearing assembly 16 is in installed position on shaft 40, the outer face 96 of inner cone 83 of inner race 74 abuts the outer side 55 of first counterweight 42. As a result, if an attempt is made to remove main bearing assembly 14 from shaft 40 by means of a conventional bearing puller (not shown), the claws (not shown) of the puller can only, as FIG. 9 makes clear, engage the inner edge 98 of the outer race 76 and/or the exposed edge 101 of the inner cage 80. Exertion of axial force on either or both of the outer race 76 and cage 80 would cause force to be transmitted therefrom through the rolling elements 90 to the inner race 74 and this can cause damage to the bearing assembly 16 and render it unfit for further service.

Therefore, in accordance with the present invention improved means are provided to remove main bearing assemblies 16 and 18 from the shafts 40 and 52, respectively. Since the removal means for each bearing assembly 16 and 18 are similar in construction and mode of operation, only the removal for main bearing assembly 16 is hereinafter described in detail.

Thus, as FIGS. 3, 4 and 9 show, the present invention is applicable to crankshaft 14 having at least one counterweight 42, a shaft 40 extending from one side 55 of the counterweight 42 along axis of rotation 57 and adapted to have bearing assembly 16 friction-fitted thereon, and a crank pin 44 extending from the opposite side 58 of the counterweight 42. The crankshaft 14 is provided in accordance with the invention with a plurality of (two) threaded screw-receiving holes 100 extending through two portions designated 106 of counterweight 42. Each hole 100 has a hole axis 102 (see FIG. 9) and these axes are parallel to, spaced from and lie on different sides of the axis of rotation 57. Each hole 102 is positioned so as to be aligned with the hollow cylindrical inner portion or inner race 74 of bearing assembly 16 mounted on shaft 14. Simultaneous rotating equalized insertion of screws, such as screw 104 shown in FIGS. 3, 4 and 9, into the holes 100 from the opposite side 58A of the counterweight 42 causes the screw ends to engage the inner portion 74 of the bearing assembly 16 and force the bearing assembly away from the counterweight 42 and off of the shaft.

In the preferred embodiment disclosed herein the crankshaft 14 comprises a pair of counterweights 42 and 50, shafts 40 and 52 at opposite ends of the crankshaft 14, each shaft 40 and 52 extending from the outer side 55 and 66 of its counterweight along a common axis of rotation P1. Each shaft 40 and 52 has a cylindrical shaft portion 54 adapted to have a bearing assembly 16 and 18 friction-fitted thereon in a butting relationship with the outer side of a counterweight. The pair of crank pins 44 and 48 extend from the inner sides 58 and 62 of counterweights 42 and 50 along a respective crank pin axis 60 and 64 which are spaced from, parallel to and on opposite sides of common axis of rotation 57. The link 46 is connected between the ends of the crank pins 44 and 48. Each counterweight 42 and 50 is provided with at least a pair of threaded screw-receiving holes 100 extending through flange-like portions 106 of the counterweights.

As FIG. 9 shows, each screw 104 is of sufficient length to ensure that the bearing assembly 16 (or 18) can be pushed completely off the shaft portion 54 whereat frictional engagement occurs. Therefore, the shank 105 of each screw 104, measured from the underside of its head to its opposite end or tip 109, must be at least as long as the distance between the inner side 112 of the flange portion 106 of the counterweight 42 whereat the screw 104 enters its threaded bore 100 and the outer side 55 of the counterweight 42 whereat the screw exits plus the length of the shaft portion 54 whereat press-fitting of the bearing assembly 16 occurs. However, the entire screw 104 cannot be longer than the distance between inner side 112 of flange portion 106 of the counterweight 42 whereat the screw enters and the confronting side 73 of crank shaft link 46 or else the screw cannot be inserted. Thus, in further accordance with the invention, counterweight 42 is provided with counterweight flange portion 106 in which the screwhole 100 is formed which is of lesser thickness (between surfaces 112 and 55) than the counterweight 42 (between surfaces 58A and 55) and is so located on the counterweight 42 that the distance between the flange face 112 whereat the screw 104 enters and the aforesaid side 73 of link 46 is at least as great as the entire length of screw 104, including shank 105 and head 107.

Although the bearing assemblies 16 and 18 disclosed herein take the form of roller bearings having an inner bearing race 74, it is apparent that the invention could be employed to effect removal of a bearing assembly of a different configuration but having or comprising a member corresponding to inner race 74 as regards friction fit and presenting difficulty of access for removal.

I claim:

1. In a crankshaft:

a counterweight;

a shaft extending from one side of said counterweight along an axis of rotation and adapted to have a bearing friction-fitted thereon;

and a crank pin extending from the opposite side of said counterweight;

said counterweight being provided with a plurality of threaded screw-receiving holes for receiving screw means and extending through said counterweight, said holes having hole axes which are parallel to, spaced from and lie on different sides of said axis of rotation, each hole being positioned to receive said screw means so as to be aligned with a bearing on said shaft for removing said bearing from said shaft.

2. A crankshaft according to claim 1 wherein two of said holes are provided and wherein the two hole axes thereof are circumferentially spaced apart by 180° from each other.

3. A crankshaft according to claim 2 wherein said crank pin extends along a crank pin axis which is spaced from and parallel to said axis of rotation, both said crank pin axis and said axis of rotation lying in a first plane;

and wherein said two hole axes lie in a second plane which is parallel to and intersects said first plane.

4. In a crankshaft:

a counterweight;

a shaft at one end of said crankshaft extending from one side of said counterweight along an axis of rotation and adapted to have a bearing friction fitted thereon;

a crank pin extending from the opposite side of said counterweight along a crank pin axis which is spaced from and parallel to said axis of rotation;

a link at an end of said crank pin and axially spaced from said counterweight;

said counterweight being provided with a plurality of threaded screw-receiving holes for receiving screw means and extending through said counterweight, said holes having hole axes which are parallel to, spaced from and lie on different sides of said axis of rotation, each hole being positioned to receive said screw means so as to be aligned with a bearing on said first shaft for removing said bearing from said shaft.

5. A crankshaft according to claim 4 wherein said plurality of holes comprises two holes and wherein the axes of said two holes are circumferentially spaced apart by 180° from each other.

6. A crankshaft according to claim 5 wherein said axis of rotation and said crank pin axis lie in a first plane, and wherein said two hole axes lie in a second plane which is parallel to and intersects said first plane.

7. A crank shaft according to claim 4 or 5 or 6 wherein said shaft has a bearing-receiving portion of predetermined axial length, which bearing-receiving portion extends axially from said one side of said counterweight;

wherein said counterweight has at least one portion of predetermined axial width measured between said one side of said counterweight and an opposite surface of said counter-weight at which an end of at least one of said screw-receiving holes opens;

and wherein the axial distance between said opposite surface and said link is at least as great as said predetermined axial length of said bearing portion of said shaft plus said predetermined axial width of said portion of said counterweight.

8. A crankshaft according to claim 7 wherein said counterweight has a plurality of said portions, each of said portions accomodating one of said screw-receiving holes.

9. In combination:

a crankshaft comprising:

a counterweight having opposite sides;

a shaft extending from one side of said counterweight along an axis of rotation, said shaft having a bearing-receiving portion extending from said one side of said counterweight for a predetermined distance;

a crank pin extending from the opposite side of said counterweight along a pin axis which is parallel to and spaced from said axis of rotation;

and a link at an end of said crank pin;

a bearing means mounted on said shaft and comprising:

a bearing member having a hole therethrough in which said bearing-receiving portion is frictionally engaged, said bearing member having an inner end surface disposed adjacent said one side of said counterweight;

and means for removing said bearing means from said shaft comprising:

a plurality of threaded screw-receiving holes extending through said counterweight, said holes having hole axes which are parallel to, spaced from and lie on different sides of said axis of rotation, each hole being positioned so as to be aligned with said bearing member on said shaft;

and a screw for each of said screw-receiving holes, said screw being of sufficient length to ensure that said bearing assembly can be pushed completely off said bearing-receiving portion of said shaft whereat frictional engagement occurs, said screw being of a length which enables it to fit between said counterweight and said link.

* * * * *